(12) United States Patent
Suh et al.

(10) Patent No.: US 8,095,079 B2
(45) Date of Patent: Jan. 10, 2012

(54) DECENTRALIZED CONTROL OF FEEDBACK FOR MULTI-USER DIVERSITY

(75) Inventors: Jung Hoon Suh, Yongin-si (KR); Bruno Clerckx, Yongin-si (KR); Seung Young Park, Gwangju (KR); David J. Love, West Lafayette, IN (US); Dae Young Park, Seoul (KR); Il Han Kim, Geumwang-eup (KR)

(73) Assignees: Samsung Electronics Co., Ltd., Suwon-si (KR); Purdue Research Foundation, West Lafayette, IN (US)

( * ) Notice: Subject to any disclaimer, the term of this patent is extended or adjusted under 35 U.S.C. 154(b) by 996 days.

(21) Appl. No.: 12/033,571

(22) Filed: Feb. 19, 2008

(65) Prior Publication Data

US 2008/0242332 A1 Oct. 2, 2008

(30) Foreign Application Priority Data

Mar. 26, 2007 (KR) .................. 10-2007-0029467

(51) Int. Cl.
*H04B 1/00* (2006.01)
*H04B 7/00* (2006.01)

(52) U.S. Cl. .......... 455/69; 455/418; 455/420; 455/453; 455/67.11; 455/67.13; 455/63.1; 455/68; 455/70; 455/522

(58) Field of Classification Search ............... 455/418, 455/420, 453, 67.11, 67.13, 68–70, 561, 455/522, 63.1

See application file for complete search history.

(56) References Cited

U.S. PATENT DOCUMENTS

| | | | |
|---|---|---|---|
| 7,406,336 B2 * | 7/2008 | Astely et al. ............... | 455/562.1 |
| 2006/0079221 A1 * | 4/2006 | Grant et al. .................. | 455/423 |
| 2006/0087972 A1 | 4/2006 | Jalali et al. | |
| 2007/0047502 A1 * | 3/2007 | Marinier et al. ............. | 370/335 |
| 2007/0049280 A1 * | 3/2007 | Sambhwani et al. ......... | 455/442 |
| 2007/0274343 A1 * | 11/2007 | Nishio ......................... | 370/479 |
| 2008/0045228 A1 * | 2/2008 | Zhang et al. ................. | 455/450 |

FOREIGN PATENT DOCUMENTS

| | | |
|---|---|---|
| KR | 2005-123434 | 12/2005 |
| KR | 640470 | 10/2006 |
| KR | 720872 | 5/2007 |

OTHER PUBLICATIONS

T. Yoo et al., "Multi-Antenna Broadcast Channels with Limited Feedback and User Selection," draft, Jun. 8, 2006, later published as "Multi-Antenna Downlink Channels with Limited Feedback and User Selection" in *IEEE Journal on Selected Areas in Communications*, vol. 25, No. 7, Sep. 2007, pp. 1478-1491.

V. Hassel et al., "A Threshold-Based Channel State Feedback Algorithm for Modern Cellular Systems," draft, Jan. 8, 2007, later published in *IEEE Transactions on Wireless Communications*, vol. 6, No. 7, Jul. 2007, pp. 2422-2426.

* cited by examiner

*Primary Examiner* — Tuan A Tran
(74) *Attorney, Agent, or Firm* — NSIP Law

(57) ABSTRACT

A communication apparatus includes a mobile terminal to measure a downlink channel state of a downlink between a base station and the mobile terminal, and to determine whether to transmit feedback information about the downlink channel state to the base station based on the measured downlink channel state.

21 Claims, 8 Drawing Sheets

DECENTRALIZED CONTROL OF FEEDBACK FOR MULTI-USER DIVERSITY

CROSS-REFERENCE TO RELATED APPLICATIONS

This application claims the benefit of Korean Patent Application No. 2007-29467 filed on Mar. 26, 2007, in the Korean Intellectual Property Office, the disclosure of which is incorporated herein by reference in its entirety.

BACKGROUND OF THE INVENTION

1. Field of the Invention

Aspects of the invention relate to a mobile communication apparatus and method, and more particularly to a multi-user diversity communication method and apparatus that can receive a fed-back downlink channel state from a mobile terminal and select a mobile terminal to receive data using the fed-back downlink channel state.

2. Description of the Related Art

Currently, mobile devices provide various services such as voice communication, image communication, data communication, instant messaging, movie viewing, web services, games, and the like due to the remarkable development of wireless networks. However, users would like to these services at a higher data transmission speed.

Multi-user diversity is a scheme for communication between a base station and a plurality of mobile terminals served by the base station that concentrates on transmitting data to only ones of the mobile terminals that have an excellent wireless channel state between the base station and the ones of the mobile terminal, and can thereby improve data transmission efficiency.

When a wireless channel state between a base station and a mobile terminal is excellent, data can be transmitted at a higher transmission speed. Conversely, when the wireless channel state between the base station and the mobile terminal is poor, the data transmission speed may be limited by the wireless channel, causing data to be transmitted at a comparatively lower transmission speed. Due to movement of the mobile terminal, fading, and the like, the wireless channel state varies over time. Accordingly, although the mobile terminal may have a poor wireless channel state at one point in time, it may have an excellent channel state at another point in time.

Accordingly, if the base station can know the wireless channel state between the base station and the mobile terminal, the base station can concentrate on transmitting data to only a mobile terminal having an excellent wireless channel state, and thus the overall data transmission speed in the base station can be improved.

Also, research is underway on various methods to improve a transmission speed between a base station and a mobile station by using a plurality of antennas in the base station.

For example, a method of communication between a base station and a mobile terminal using a plurality of antennas is one of a number of important technologies to achieve a high data transmission speed and a high reliability.

Also, a method to transmit a signal using a plurality of antennas and thereby improve a communication performance includes schemes, such as a downlink beamforming scheme, a transmit diversity scheme, and the like. The transmit diversity scheme includes a closed-loop transmit diversity scheme in which information needs to be fed back from a mobile terminal to a base station, and an open-loop transmit diversity scheme in which information does not need to be fed back from the mobile terminal to the base station.

In the case of the downlink beamforming scheme, a base station concentrates on transmitting a signal to a mobile terminal located in a particular direction using a transmitting antenna of the base station, and does not transmit a signal to mobile terminals located in other directions, and thus interference signals transmitted to the other mobile terminals can be eliminated. Accordingly, the downlink beamforming scheme can improve the communication quality of a downlink over which data is transmitted to the mobile terminal, and also can improve a data transmission speed.

However, in the case of the downlink beamforming scheme, a number of nulls to eliminate the interference signals s defined by a number of degrees of freedom, which is determined by a number of transmitting antennas of the base station. Accordingly, it is difficult to apply the downlink beamforming scheme in a general mobile communication environment in which a number of mobile terminals served by the base station is much greater than a number of transmitting antennas of the base station.

SUMMARY OF THE INVENTION

Aspects of the invention relate to a communication method in a mobile terminal that can reduce an amount of downlink channel state information to be fed back from the mobile terminal to a base station, and to a mobile terminal using the communication method.

Other aspects of the invention relate to a communication method in a base station in which a base station, which determines whether to transmit data to a mobile terminal based on feedback information received from the mobile terminal, can readily determine whether to transmit data to one mobile terminal without considering feedback information about a downlink channel state of another mobile terminal, and a base station using the communication method.

According to an aspect of the invention, a communication apparatus includes a mobile terminal to measure a downlink channel state of a downlink between a base station and the mobile terminal, and to determine whether to transmit feedback information about the downlink channel state to the base station based on the measured downlink channel state.

According to another aspect of the invention, a communication apparatus includes a base station to determine whether to transmit data to a mobile terminal based on feedback information received from the mobile terminal about a downlink channel state of a downlink between the base station and the mobile terminal; wherein the base station measures an uplink channel state of an uplink between the mobile terminal and the base station over which the feedback information is received from the mobile terminal, and determines whether to use the feedback information received from the mobile terminal based on the measured uplink channel state.

Additional aspects and/or advantages of the invention will be set forth in part in the description that follows and, in part, will be obvious from the description, or may be learned by practice of the invention.

BRIEF DESCRIPTION OF THE DRAWINGS

The above and/or other aspects and advantages of the invention will become apparent and more readily appreciated from the following description of embodiments of the invention, taken in conjunction with the accompanying drawings of which.

DETAILED DESCRIPTION OF THE EMBODIMENTS

Figure 1:
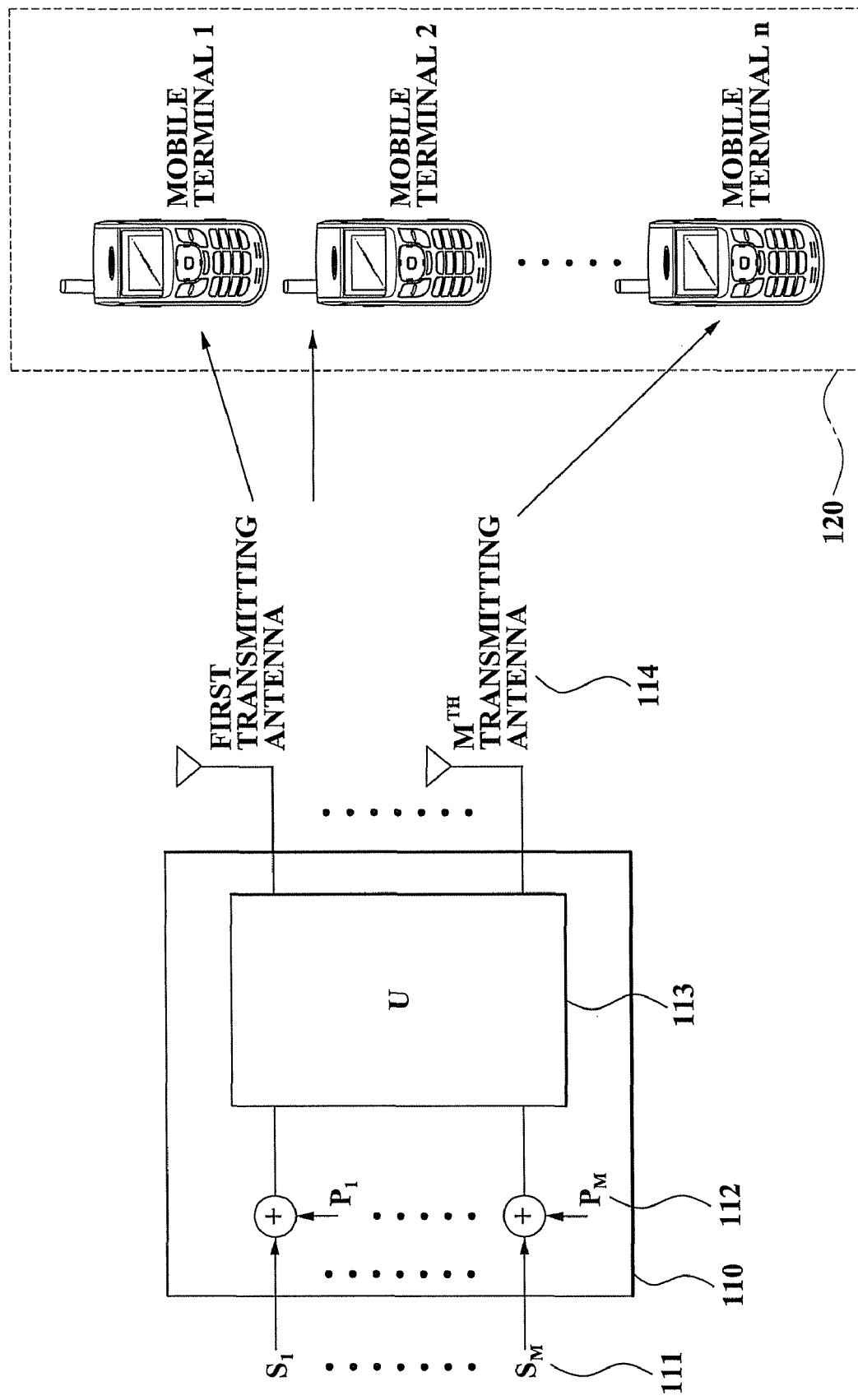
FIG. 1 shows an operation of transmitting pilot signals from a base station to a plurality of mobile terminals served by the base station for use by the mobile terminals in measuring a downlink channel state in a communication system using a combination of a multi-user diversity scheme and a downlink beamforming scheme according to an aspect of the invention.

Reference will now be made in detail to embodiments of the invention, examples of which are shown in the accompanying drawings, wherein like reference numerals refer to like elements throughout. The embodiments are described below to explain the invention by referring to the figures.

Currently, a communication scheme such as per-user unitary rate control (PU2RC or PU$^2$RC) is under consideration. Such a communication scheme attempts to perform downlink beamforming with respect to a mobile terminal having an excellent downlink channel state using a plurality of transmitting antennas in a base station to improve a transmission speed between the base station and the mobile terminal.

Specifically, M transmitting antennas are provided in a base station, and M mobile terminals having an excellent downlink channel state are selected based on downlink channel state information fed back from the mobile terminals to the base station. Then, data is transmitted from the base station to the M mobile terminals having the excellent downlink channel state using a downlink beamforming scheme.

However, the downlink channel state changes over time. Accordingly, even though a mobile terminal may have a comparatively poor downlink channel state at one point in time and therefore does not communicate with a base station, the mobile terminal may communicate with the base station at another point in time when it has an excellent downlink channel state. Since the base station communicates with mobile terminals having the excellent downlink channel state at all times, diversity gain according to different mobile terminals may be achieved.

FIG. 1 shows an operation of transmitting pilot signals from a base station to a plurality of mobile terminals served by the base station for use by the mobile terminals in measuring a downlink channel state in a communication system using a combination of a multi-user diversity scheme and a downlink beamforming scheme according to an aspect of the invention.

Referring to FIG. 1, different pilot signals 112 (P1, P2, ..., PM) are input to a beamforming matrix 113 to be multiplied by the beamforming matrix 113 to form M downlink beams, and transmitted from a base station 110 to n mobile terminals 120 over downlink channels via M transmitting antennas 114 provided in the base station 110, which include a first transmitting antenna, a second transmitting antenna, ..., and an M-th transmitting antenna. The pilot signals 112 may have known patterns and may be orthogonal to each other, and the mobile terminals 120 may know the patterns of the pilot signals 112. Later, M mobile terminals having an excellent downlink channel state are selected from the n mobile terminals 120 as described in greater detail below, and M data signals 111 (S1, S2, ... SM) are input to the beamforming matrix 113 to be multiplied by the beamforming matrix 113 to form M downlink beams, and transmitted to respective ones of the M mobile terminals over downlink channels via the M antennas 114 of the base station 110.

Each of the n mobile terminals 120 receives the pilot signals 112 via the downlink channels and measures a downlink channel state with respect to each of the pilot signals 112 as described below with reference to FIG. 2.

Figure 2:
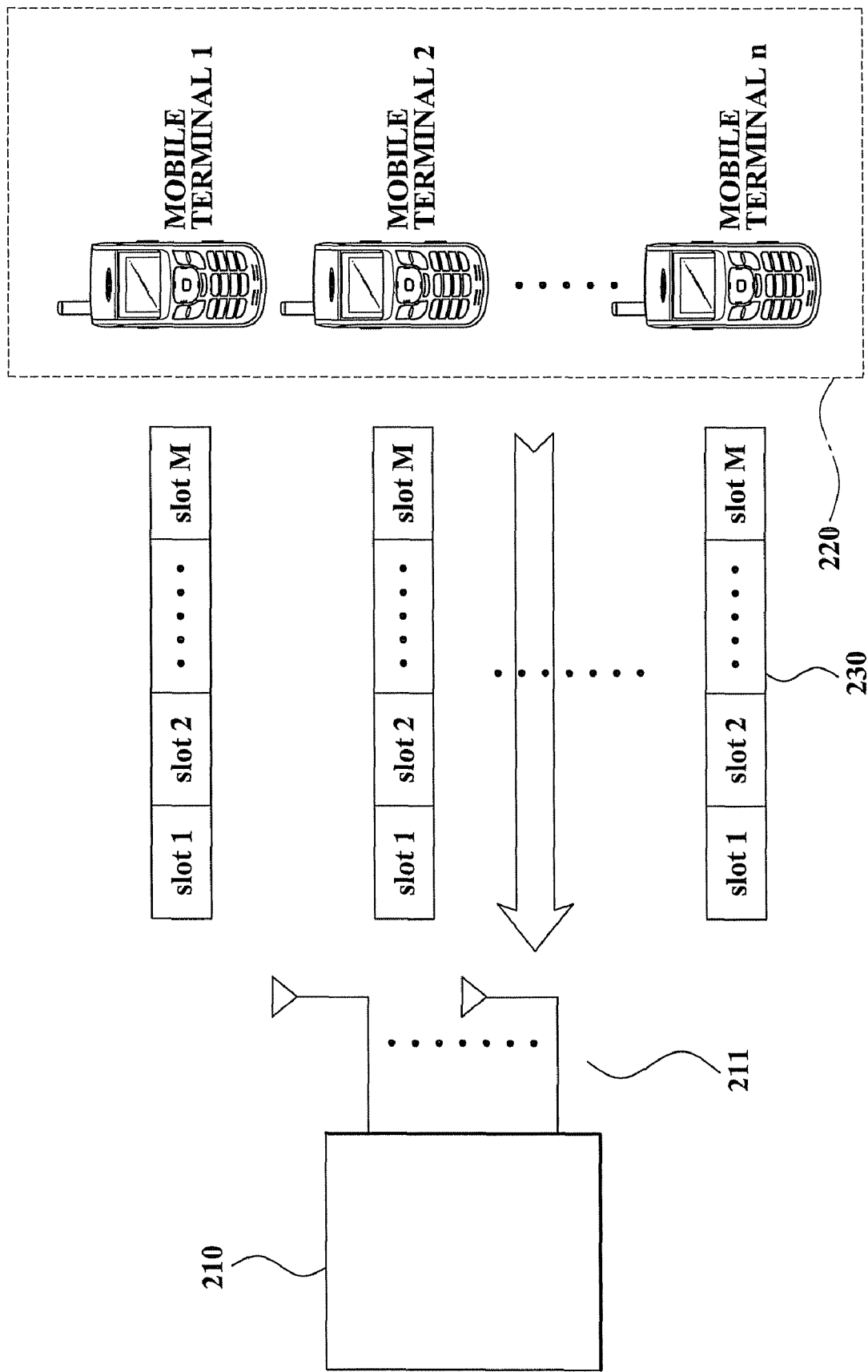
FIG. 2 shows an operation of measuring a downlink channel state of each of a plurality of mobile served by a base station provided with M transmitting antennas, and feeding back the measured downlink channel state to the base station in a communication system using a combination of a multi-user diversity scheme and a downlink beamforming scheme according to an aspect of the invention.

FIG. 2 shows an operation of measuring a downlink channel state of each of a plurality of mobile terminals 220 served by a base station 210 provided with M transmitting antennas 211, and feeding back the measured downlink channel state to the base station 210 according to an aspect of the invention.

Referring to FIG. 2, each of the plurality of mobile terminals 220 served by the base station 210 measures M downlink channel state information 230 with respect to pilot signals received from the base station 210 via M downlink beams, and transmits the measured M downlink channel state information 230 to the base station 210 via M time slots of an uplink. The M beams are formed using the M transmitting antennas 211 of the base station 210. There are M time slots for each of the n mobile terminals 220, so there are a total of M×n time slots for all of the mobile terminals 220.

The base station 210 analyzes the downlink channel state information 230 transmitted from each of the n mobile terminals 220 via the M×n time slots, and selects M mobile terminals having an excellent downlink channel state from the n mobile terminals 220 based on the analyzed downlink channel state information 230, i.e., selects one mobile terminal 220 for each of the M downlink beams.

Figure 3:
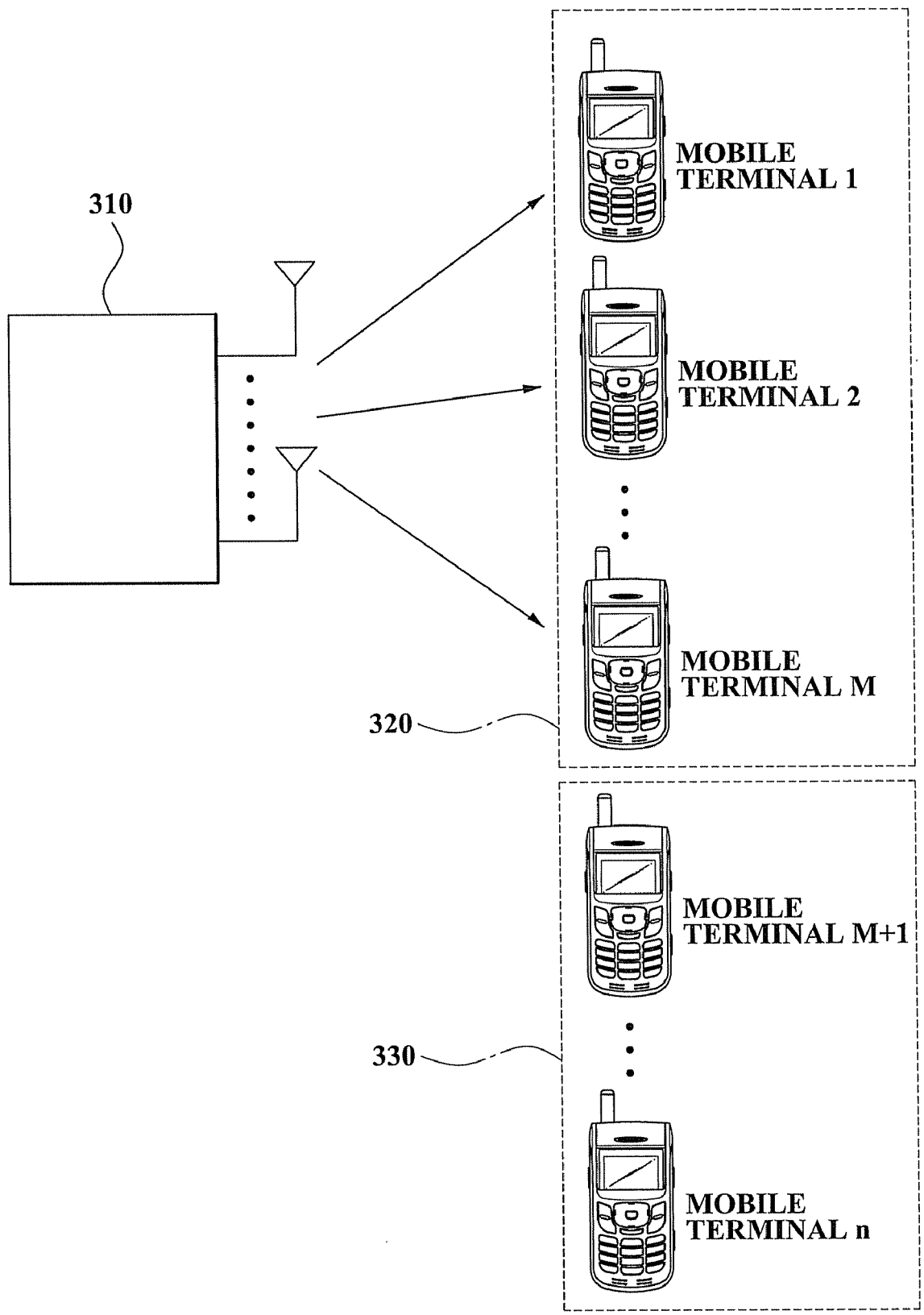
FIG. 3 shows an operation of communicating between a base station and M mobile terminals having an excellent downlink channel state that were selected from n mobile terminals served by the base station based on feedback information transmitted from the n mobile terminals to the base station in a communication system using a combination of a multi-user diversity scheme and a downlink beamforming scheme according to an aspect of the invention.

FIG. 3 shows an operation of communicating between a base station 310 and M mobile terminals 320 1 through M having an excellent downlink channel state that were selected from n mobile terminals served by the base station 310 based on feedback information transmitted from the n mobile terminals to the base station 310 according to an aspect of the invention. Other mobile terminals 330 M+1 through n having a poor downlink channel state do not communicate with the base station 310.

Referring to FIG. 3, in order to transmit data to only the mobile terminals 320 having the excellent downlink channel state among the mobile terminals 320 and 330 served by the base station 310, and thereby achieve multi-user diversity gain, as described above with respect to FIG. 2, each of the mobile terminals 320 and 330 previously measured the downlink channel state between the base station 310 and the mobile terminals 320 and 330 and fed back the measured downlink channel state to the base station 310, and the base station 310 selected the M mobile terminals 320 to receive data based on the fed-back downlink channel state.

Figure 4:
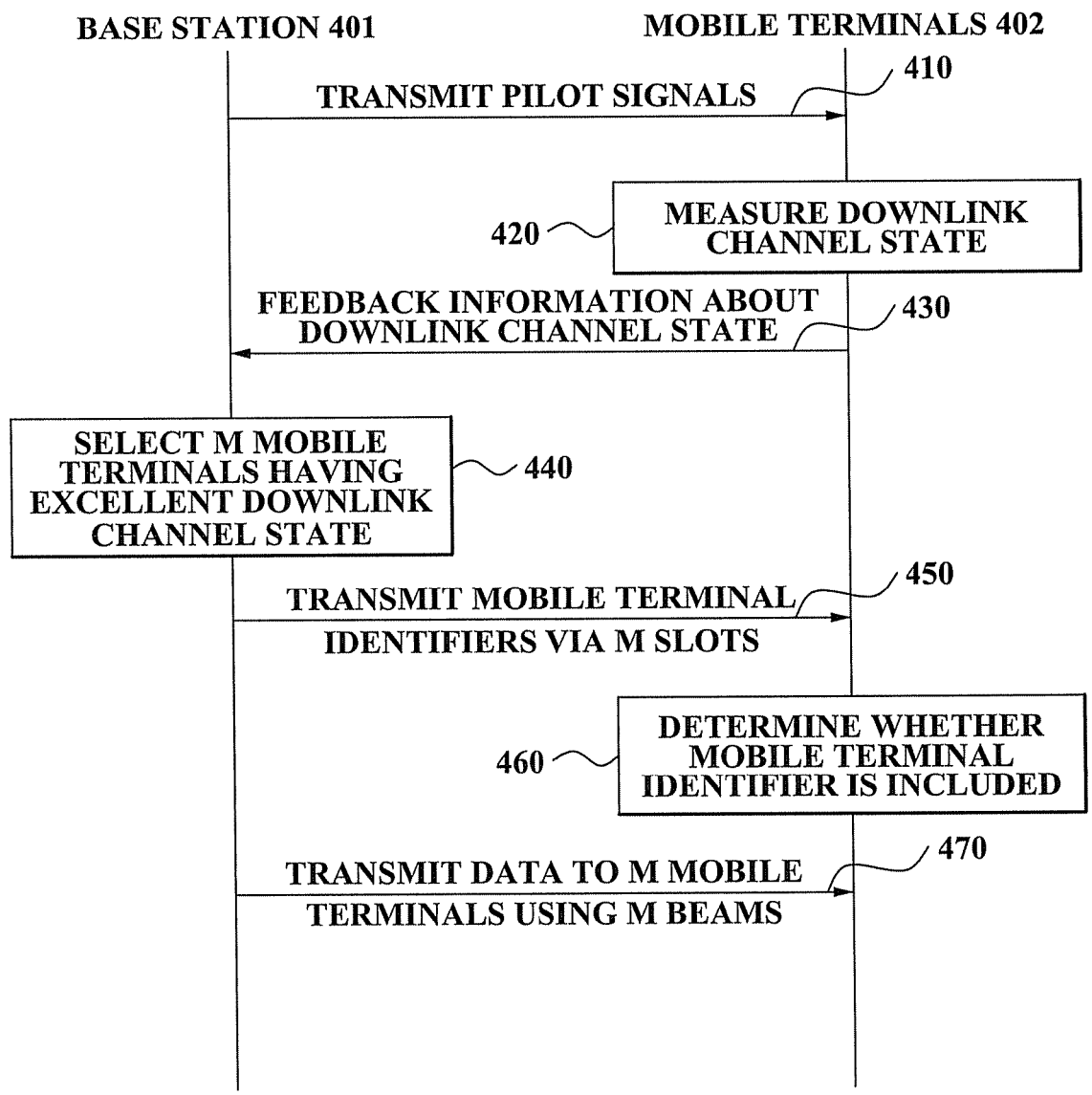
FIG. 4 is a flowchart of operations in a base station and mobile terminals that are performed to transmit data from the base station to the mobile terminals via a plurality of antennas provided in the base station based on information fed back to the base station from the mobile terminals according to an aspect of the invention.

FIG. 4 is a flowchart of operations in a base station 401 and mobile terminals 402 that are performed to transmit data from the base station 401 to the mobile terminals 402 via a plurality of antennas provided in the base station 401 based on information fed back to the base station 401 from the mobile terminals 402 according to an aspect of the invention.

Referring to FIG. 4, in operation 410, the base station 401 provided with M transmitting antennas transmits M beamformed pilot signals over M downlink beams to each of the mobile terminals 402 using the M transmitting antennas.

In operation 420, each of the mobile terminals 402 receives the M beam-formed pilot signals via the M downlink beams, and measures a downlink channel state with respect to each of the M beam-formed pilot signals.

In operation 430, each of the mobile terminals 402 transmits M measurement values, i.e., M downlink channel states, to the base station 402 via M time slots of an uplink. Assuming that n mobile terminals 402 are served by the base station 401, a total of M×n downlink channel states are fed back from the n mobile terminals 402 to the base station 401.

In operation 440, the base station 401 analyzes the downlink channel states fed back from the n mobile terminals 402 via the uplink, and selects M mobile terminals having an excellent downlink channel state, one for each of the M beams, from the n mobile terminals 402.

In operation 450, the base station 401 transmits mobile terminal identifiers of the selected M mobile terminals via M time slots of the downlink. The mobile terminal identifier may be a character string that enables the base station 401 to identify a corresponding mobile terminal from the n mobile terminals served by the base station 401. As a simple example, a telephone number assigned to the mobile terminal may be used as the mobile terminal identifier. Also, an Electronic Serial Number (ESN) of a Code Division Multiple Access (CDMA) mobile communication scheme, an International Mobile Equipment Identity (IMEI) of a Global System for Mobile Communications (GSM) mobile communication scheme, and the like may be used as the mobile terminal identifier. Also, a unique value of the mobile terminal may be used as the mobile terminal identifier. Also, the mobile terminal identifier may be a random value generated by the mobile terminal. Also, the mobile terminal identifier may be a value assigned by the base station, and in this case, the base station needs to transmit the assigned mobile terminal identifier to the corresponding mobile terminal via a transmitter. However, it is understood that other types of mobile terminal identifiers may be used according to other aspects of the invention.

In operation 460, each of the mobile terminals 402 receives the M mobile terminal identifiers via the downlink, and determines whether its own mobile terminal identifier is included therein. Also, in operation 460, when one of the mobile terminals 402 determines that its own mobile terminal identifier is included in the M mobile terminal identifiers, that mobile terminal 402 determines which time slot its own mobile terminal identifier appears in.

For example, when a mobile terminal identifier appears in a k-th time slot, this indicates that the base station 401 will communicate with the mobile terminal identified by that mobile terminal identifier via a k-th beam. Accordingly, that mobile terminal prepares to receive data from the base station 401.

In operation 470, the base station 401 transmits data to each of the M mobile terminals 402 having the excellent downlink channel state via the M downlink beams. Since downlink beamforming is performed for the M mobile terminals 402, the M mobile terminals 402 do not act as interference signal sources with respect to one other. Accordingly, data may be transmitted at a comparatively higher speed via a downlink channel having a comparatively lower signal-plus-interference to noise ratio (SINR).

Figure 5:
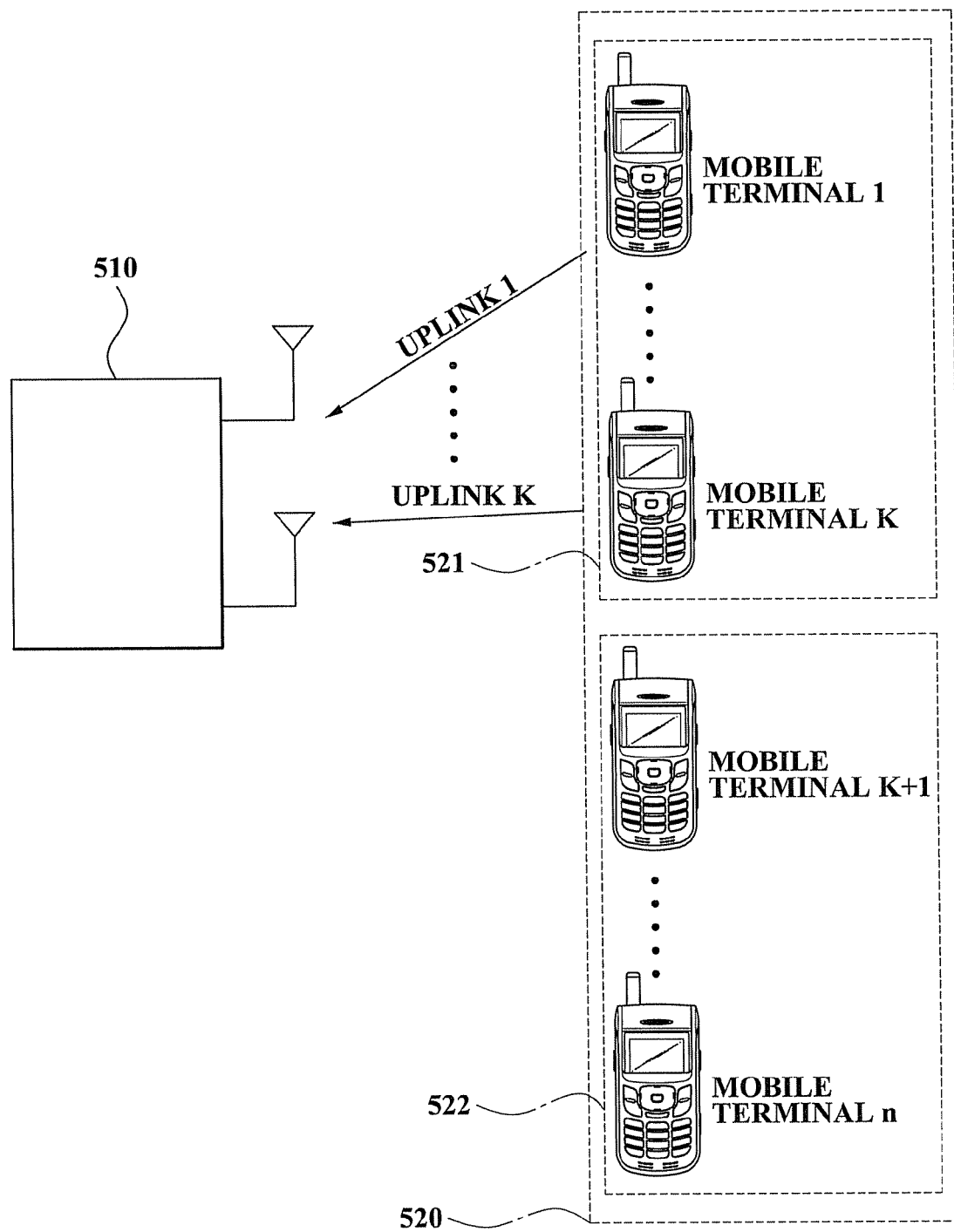
FIG. 5 shows an operation in which only a portion of n mobile terminals served by a base station provided with M transmitting antennas which receive pilot signals from the base station and measure a downlink channel state using the pilot signals, feed back the measured downlink channel state to the base station via an uplink according to an aspect of the invention.

FIG. 5 shows an operation in which only a portion 521 of n mobile terminals 520 served by a base station 510 provided with M transmitting antennas, which receive pilot signals from the base station 510 and measure a downlink channel state using the pilot signals, feed back the measured downlink channel state to the base station 510 via an uplink according to an aspect of the invention.

When the downlink channel state measured by one of the mobile terminals 520 is poor, and that one of the mobile terminals 520 feeds back the measured downlink channel state to the base station 510 via an uplink, the measured downlink channel state of that one of the mobile terminals 520 is likely to be worse than a downlink channel state measured by another one of the mobile terminals 520. Also, ones of the mobile terminals 520 having a poor downlink channel state have a smaller probability of being selected by the base station 510 to receive data via a downlink than ones of mobile terminals 520 having a comparatively better downlink channel state.

Accordingly, when the downlink channel state measured by a mobile station 520 using the pilot signals is poor, it may be more advantageous for that mobile station 520 not to feed back information about the downlink channel state to the base station 510 to improve the overall network efficiency. Also, since the base station 510 analyzes fed-back downlink channel state information to select ones of the mobile terminals 520 to receive data via a downlink, the computational complexity of the analysis may be reduced.

According to an aspect of the invention, each of the mobile terminals 520 served by the base station 510 measures a downlink channel state using pilot signals transmitted from the base station 510 to the mobile terminals 520, and determines whether to transmit feedback information about the measured downlink channel state to the base station 510 based on the measured downlink channel state. For mobile terminals 522 having a poor measured downlink channel state, the mobile terminals 522 do not feed back a result of the measurement to the base station 510. Thus, when the base station 510 selects ones of the mobile terminals 520 to receive data, computational complexity may be reduced and the overall network efficiency may be improved. Conversely, for mobile terminals 521 having an excellent measured downlink channel state, the mobile terminals 521 do feed back a result of the measurement to the base station 510 so that the base station 510 may use the result of the measurement in selecting ones of the mobile terminals 520 to receive data.

According to an aspect of the invention, a downlink SINR may be used as the measured downlink channel state of the mobile terminals 520. When it is assumed that the downlink channel state is determined based on the downlink SINR, each of the mobile terminals 520 may measure a downlink SINR of a downlink via which pilot signals are transmitted. When the downlink SINR measured by one of the mobile terminals 520 is less than a predetermined threshold value, that one of the mobile terminals 520 does not transmit feedback information about the downlink channel state to the base station 510.

Specifically, among n mobile terminals 520 served by the base station 510, K mobile terminals 521 1 through K for which the measured downlink channel state is greater than the threshold value feed back the measured downlink channel state via an uplink. However, the other mobile terminals 522 K+1 through n for which the measured downlink channel state is less than the threshold value do not feed back the measured downlink channel state.

Figure 6:
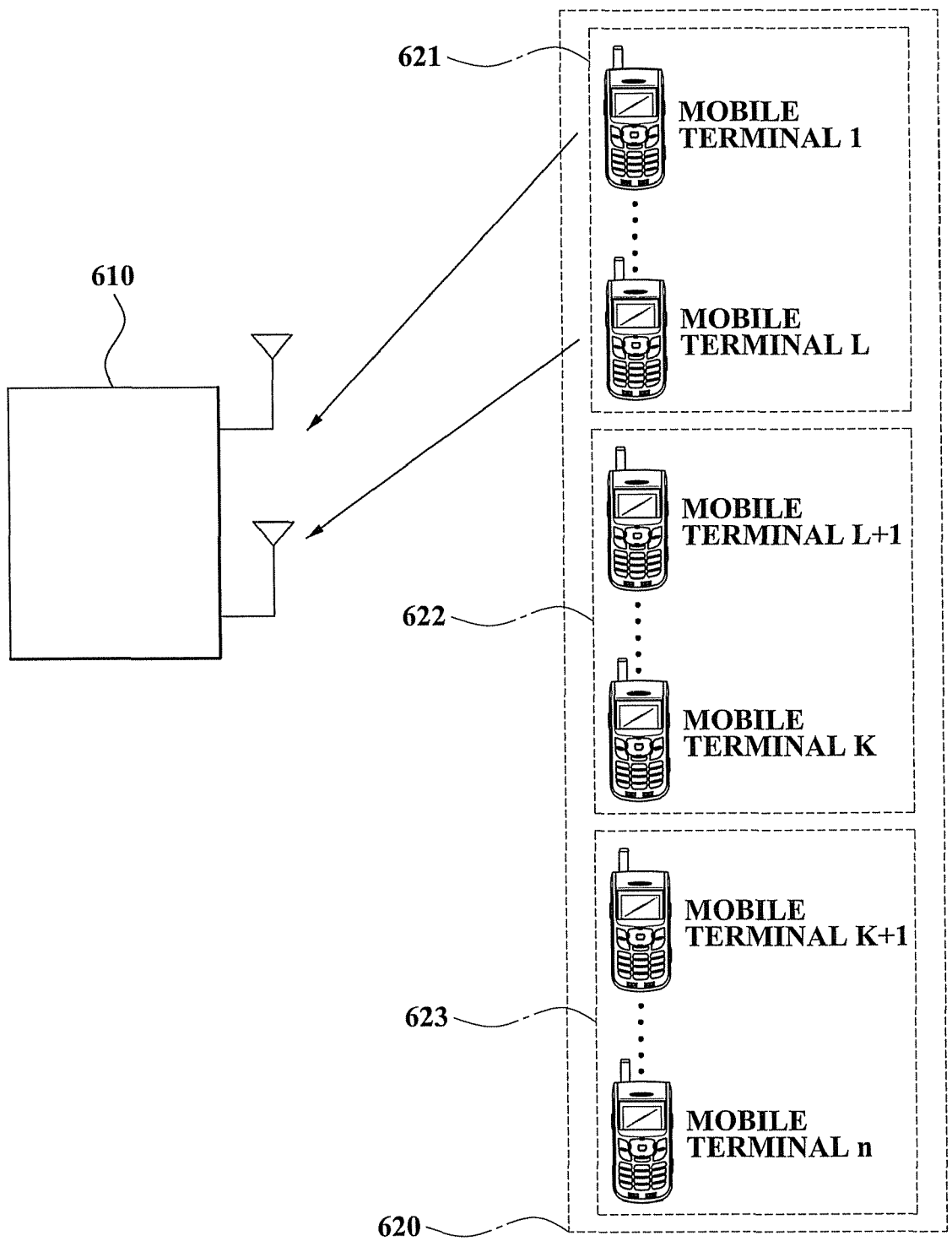
FIG. 6 shows an operation of a base station provided with M transmitting antennas that uses only a portion of downlink channel state information fed back from n mobile terminals served by the base station to select ones of the n mobile terminals to receive data according to an aspect of the invention.

FIG. 6 shows an operation of a base station 610 provided with M transmitting antennas that uses only a portion of downlink channel state information fed back from n mobile terminals 620 served by the base station 610 to select ones of the n mobile terminals 620 to receive data according to an aspect of the invention.

When an uplink channel state of an uplink via which downlink channel state information is fed back to the base station 610 from one of the mobile terminals 620 served by the base station 610 is poor, it may be highly probable that the downlink channel state information fed back to the base station 610 from the one of the mobile terminals 620 having the poor uplink channel state may be corrupted. Also, it is disadvantageous to select ones of the mobile terminals 620 to receive data using the corrupted downlink channel state information. Accordingly, the base station 610 measures the uplink channel state for each of the mobile terminals 620 that feed back the downlink channel state information to the base station 610. When the measured uplink channel state is less than a threshold value, the base station 610 may not use the downlink channel state information fed back via the corresponding uplink when selecting ones of the mobile terminals 620 to receive data.

When it is assumed that only K mobile terminals 621 (1 though L) and 622 (L+1 through K) of n mobile terminals 620 feed back a downlink channel state via an uplink, and other mobile terminals 623 (K+1 though n) of the n mobile terminals 620 do not feed back the downlink channel state, the base station 610 may measure an uplink channel state of an uplink via which information about the downlink channel state is transmitted, and determine whether to use the information received via the uplink based on the uplink channel state.

For example, the base station 610 selects ones of the mobile terminals 620 to receive data using only information about the downlink channel state transmitted from the mobile terminals 621 having the excellent uplink channel state. Thus, in this case, the base station 610 does not use downlink channel state information transmitted from the mobile terminals 622. The mobile terminals 622 have an excellent downlink channel state and therefore transmit the downlink channel state, but have a poor uplink channel state of an uplink via which the downlink channel state is fed back.

Also, the downlink channel state of the mobile terminals 623 which is not fed back via the uplink due to the poor downlink channel state is not used to select the ones of the mobile terminals 620 to receive data.

According to an aspect of the invention, the uplink channel state is determined based on an uplink SINR. Specifically, the base station 610 measures the uplink channel state of the uplink via which the downlink channel state information is fed back, and thereby calculates the uplink SINR. Also, the base station 610 determines whether to use the downlink channel state information fed back via the uplink based on the uplink SINR. For example, when the uplink SINR is less than a threshold value, the base station 610 does not use the fed-back downlink channel state information to select ones of the mobile terminal to receive data. Only when the uplink SINR is greater than the threshold value does the base station 610 use the fed-back downlink channel state information.

Figure 7:
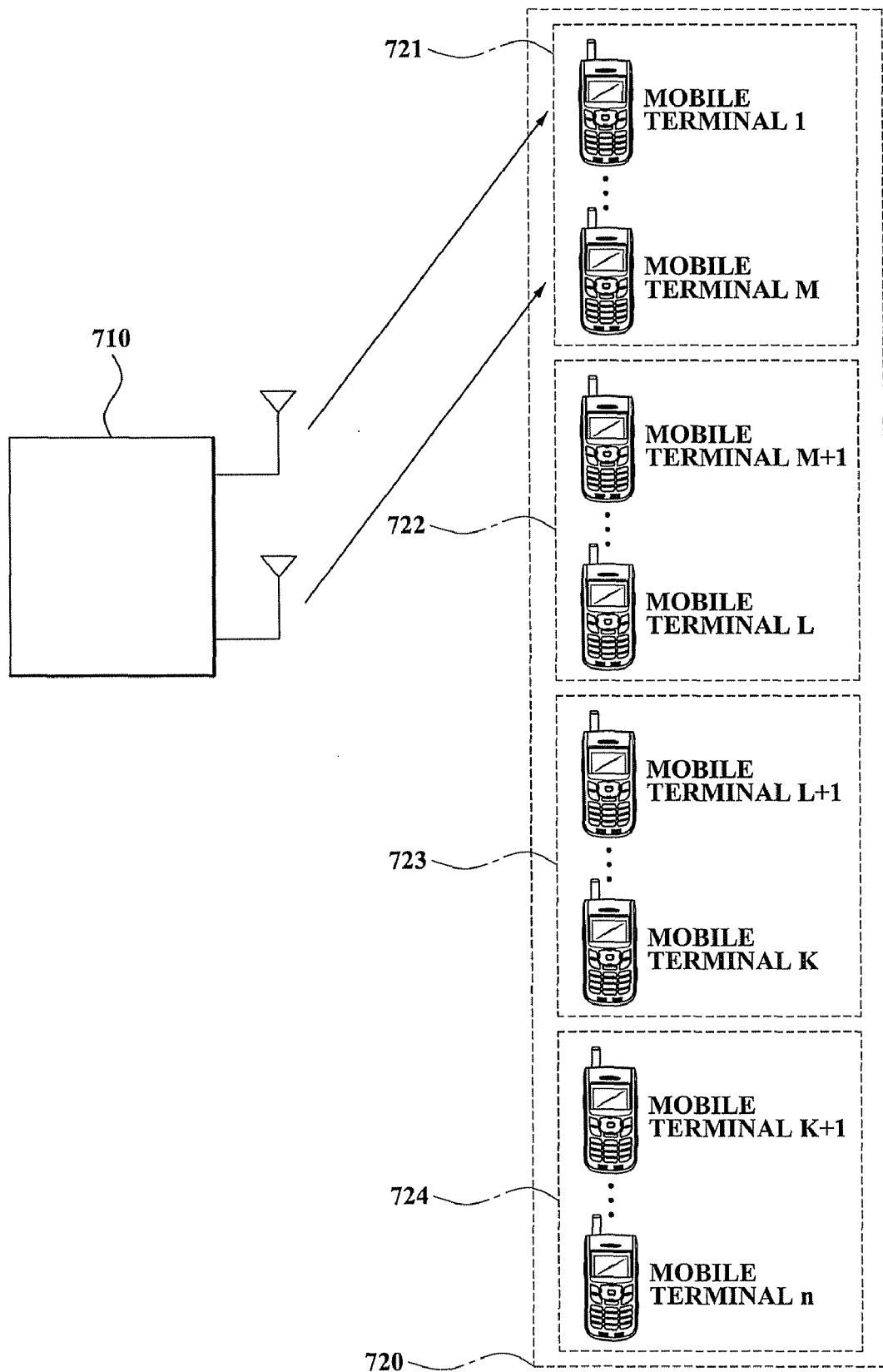
FIG. 7 shows an operation of M mobile terminals having an excellent downlink channel state receiving data from a base station provided with M transmitting antennas according to an aspect of the invention.

FIG. 7 shows an operation of M mobile terminals 721 having an excellent downlink channel state receiving data from a base station 710 provided with M transmitting antennas according to an aspect of the invention.

Referring to FIG. 7, the base station 710 includes a total of n mobile terminals 720 including mobile terminals 721 (1 to M), mobile terminals 722 (M+1 to L), mobile terminals 723 (L+1 to K), and mobile terminals 724 (K+1) to n). In this case, it is assumed that only K mobile terminals 721, 722, and 723 fed back a downlink channel state via an uplink, and that feedback information of only L mobile terminals 721 and 722 was used when the base station 710 selected ones of the mobile terminals 720 to receive data via a downlink. As a result, only the M mobile terminals 721 having the excellent downlink channel state were selected to receive data from the base station 710.

When downlink beamforming is performed using the M transmitting antennas of the base station 710, no interference may occur among downlinks to the M mobile terminals 721, and thus data may be transmitted with a comparatively higher transmission rate.

When an uplink from a mobile terminal to a base station uses a CDMA communication scheme, a gain acquired from a spread is G, and an uplink SINR used to determine whether to use downlink channel state information fed back via the uplink is $\beta$, a spreading code length N of the uplink needed to acquire the uplink SINR $\beta$ is determined using the following Equation 1:

$$N = \left\lceil 3 \cdot \beta \cdot \left( e \cdot \log\left( \frac{3}{2 \cdot (1-G)} \right) - 2 \right) \right\rceil \quad (1)$$

Here, the symbol $\lceil x \rceil$ ("ceiling x") refers to "the smallest integer not smaller than x."

Also, a downlink SINR $\gamma_{th}$ used to determine whether to feed back the downlink channel state information is determined using the following Equation 2:

$$\gamma_{th} = \bar{\gamma}_0 \cdot \log \frac{n}{\Gamma(\alpha+1)^{1/\alpha}} \quad (2)$$

Here, $\bar{\gamma}_0$ is an average SINR required to maintain the communication quality of the downlink, n is a total mobile terminals served by the base station, and $$\alpha = \left\lfloor 1 + \frac{3N}{\beta} \right\rfloor.$$

Also, the symbol $\lfloor x \rfloor$ ("floor x") refers to "the largest integer not greater than x."

When a different average SINR is required to maintain the communication quality of the downlink for each mobile terminal, the downlink SINR to determine whether to feed back the downlink channel state information is determined using the following Equation 3:

$$\gamma_{th,i} = \overline{\gamma}_i \cdot \log \frac{n}{\Gamma(\alpha+1)^{1/\alpha}} \qquad (3)$$

Here, $\overline{\gamma}_i$ is the different average SINR that is required to maintain the communication quality of the downlink for each mobile terminal, n is the total mobile terminals served by the base station, and $$\alpha = \left\lfloor 1 + \frac{3N}{\beta} \right\rfloor.$$

Also, the symbol $\lfloor x \rfloor$ ("floor x") refers to "the largest integer not greater than x."

Figure 8:
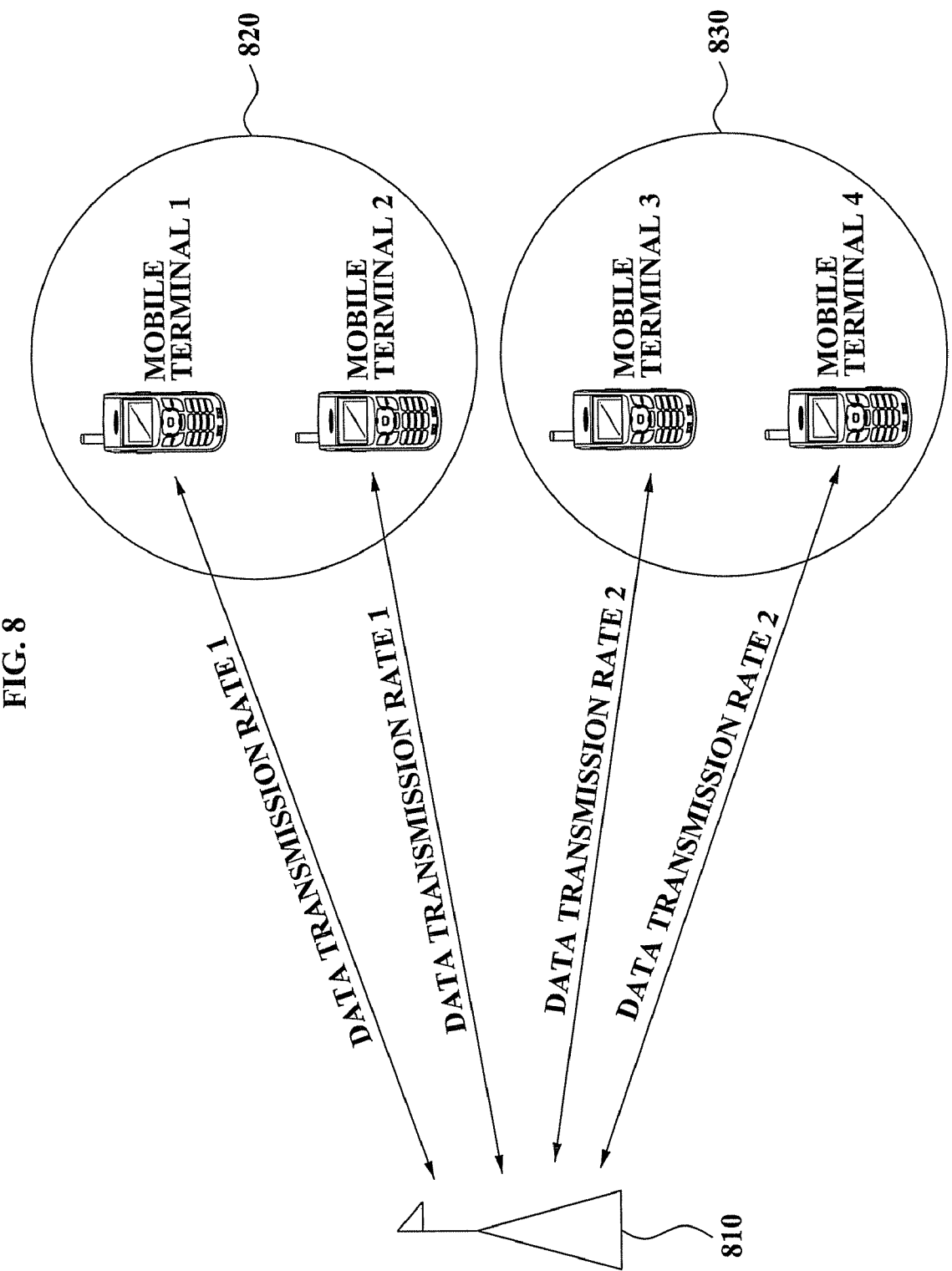
FIG. 8 shows an operation of communicating between a base station and a plurality of mobile terminals having different data transmission rates according to an aspect of the invention.

FIG. 8 shows an operation of communicating between a base station 810 and a plurality of mobile terminals 820 and 830 having different data transmission rates according to an aspect of the invention. Here, mobile terminals having the same data transmission rate may be classified into the same group of mobile terminals. Specifically, the mobile terminals 820 of a first group of mobile terminals communicate with the base station 810 at a data transmission rate 1, and the mobile terminals 830 of a second group of mobile terminals communicate with the base station 810 at a data transmission rate 2.

As shown in FIG. 8, when the plurality of mobile terminals 820 and 830 communicate with the base station 810 at different data transmission rates, a service type of each of the first group and the second group or a Quality of Service (QoS) corresponding to the service may be different. For example, while a mobile terminal using a voice service is very sensitive to transmission latency, another mobile terminal using a web browsing service is tolerant of transmission latency. Accordingly, it is inappropriate to give the same downlink data receiving opportunity to the mobile terminals using different services.

Therefore, according to an aspect of the invention, a predetermined access probability is assigned to each of the mobile terminals 820 and 830. Even when the downlink channel state is excellent, each of the mobile terminals 820 and 830 determines whether to feed back downlink channel state information based on its assigned access probability each time it measures the downlink channel state, instead of feeding back the downlink channel state information each time it measures the downlink channel state. When an access probability is assigned to each of the mobile terminals 820 and 830 based on the service type of each of the mobile terminals 820 and 830, the data transmission rate thereof, and the like, the access probability to receive data from the base station 810 via a downlink may be different for each of the mobile terminals 820 and 830 since the mobile terminals 820 and 830 use different services and/or different data transmission rates. Accordingly, the mobile terminals 820 and 830 may use the service at the different access probability. For example, when the mobile terminals 820 of the first group use the voice service, and the mobile terminals 830 of the second group use the web browsing service, a comparatively greater access probability may be assigned to the mobile terminals 820 of the first group that use the voice service so that the mobile terminals 820 may use the voice service with comparatively less transmission latency. Conversely, a comparatively smaller access probability may be assigned to the mobile terminals 830 of the second group that use the web browsing service so that the mobile terminals 830 may use the web browsing service with comparatively greater transmission latency.

As described above, the access probability assigned to each of the mobile terminals 820 and 830 may be different depending on the service type. Also, the data transmission rate of each of the mobile terminals 820 and 830 may be different depending on the service type. Accordingly, the same access probability may be set for each group of mobile terminals that use the same service. Also, the same access probability may be set for each group of mobile terminals that communicate with the base station at the same data transmission rate. When the same access probability is assigned to the same group, a fair opportunity to receive data may be assigned to the mobile terminals that use the same service, or to the mobile terminals that transmit data to the base station at the same transmission rate.

According to an aspect of the invention, an access probability that a base station assigns to each group may be determined based on a number of mobile terminals in each group and/or a ratio of radio resources allocated to each group.

Here, radio resources are resources used in wireless communication between the mobile terminal and the base station. According to an aspect of the invention, a frequency bandwidth used for communication between the base station and the mobile terminal may be used to calculate the ratio of radio resources allocated to each group. However, aspects of the invention are not limited thereto. For example, another parameter, such as a number of time slots used for communication between the mobile terminal and the base station, a number of spreading codes, and the like, may be used to calculate the ratio of radio resources allocated to each group. Also, a combination of at least two parameters may be used. Also, other parameters associated with the radio resources may be used.

In the case of a mobile terminal handling a voice call, a comparatively narrower frequency bandwidth is needed for the voice call. Also, when a voice call is transmitted using time slots, a comparatively smaller number of time slots is needed. Accordingly, a comparatively small amount of radio resources may be consumed by the mobile terminal handling the voice call. However, in the case of a mobile terminal handling a video call, a comparatively wider frequency bandwidth is needed for the video call. Also, when a video call is transmitted using time slots, a comparatively greater number of time slots is needed. Accordingly, a comparatively great amount of radio resources may be consumed by the mobile terminal handling the video call.

As described above, a base station allocates a predetermined radio resource to each group based on a service type that the mobile terminals of each group use, or a data transmission rate between the mobile terminals and the base station. Accordingly, a comparatively lower access probability is assigned to a group of mobile terminals that require a data transmission rate greater than a pre-allocated radio resource, and thereby may control the data transmission. Conversely, a comparatively greater probability is assigned to a group of mobile terminals that require data transmission rate less than the pre-allocated radio resource, and thereby may improve data transmission.

When n is a total number of mobile terminals served by a base station, $\alpha_k$ is a ratio of a total number of mobile terminals in a k-th group to the total number of mobile terminals served by the base station, where $$\sum_{k=1}^{K} \alpha_K = 1,$$

and $R_k$ is a ratio of a total amount of radio resources allocated to the k-th group to a total amount of radio resources allocated to the base station, where $$\sum_{k=1}^{K} R_k = 1,$$

k* is an index of a group that has the greatest ratio of the allocated radio resources with respect to a number of mobile terminals in the group, k* is determined using the following Equation 4:

$$k^* = \underset{1 \leq k \leq K}{\operatorname{argmax}} \frac{R_k}{\alpha_k \cdot n} \qquad (4)$$

According to an aspect of the invention, an access probability of '1' is assigned to the k*-th group, and an access probability of less than '1' is assigned to other groups to maximize the probability that mobile terminals of the k*-th group may receive data.

An access probability of less than '1' may be assigned to other groups, excluding the k*-th group, based on a ratio of radio resources allocated to each group to a number of mobile terminals in each group, and a ratio of radio resources allocated to the k*-th group to a number of mobile terminals in the k*-th group.

Accordingly, an access probability $p_k$, assigned to the k-th group may be determined using the following Equation 5:

$$p_k = \begin{cases} \frac{\alpha_{k^*} \cdot R_k}{\alpha_k \cdot R_{k^*}}, & \text{for } k \neq k^* \\ 1, & \text{for } k = k^* \end{cases} \qquad (5)$$

Referring to Equation 4 above, the k*-th group is a group that has the greatest ratio of radio resources with respect to a number of mobile terminals in the group. Specifically, the radio resources consumed by the mobile terminals in the k*-th group are less than the radio resources allocated to the k*-th group. Accordingly, there are a sufficient amount of radio resources to be allocated to a mobile terminal that belongs to the k*-th group and feeds back a downlink channel state, and therefore needs radio resources.

Referring to Equation 5 above, an access probability of '1' is assigned to the k*-th group that has the greatest ratio of radio resources with respect to the number of mobile terminals in the group. Accordingly, when a downlink channel state measured using pilot signals is excellent, the mobile terminals of the k*-th group unconditionally feed back the measured downlink channel state to the base station via the uplink each time they measure the downlink channel state. However, an access probability of less than '1' is assigned to the mobile terminals of the k-th group excluding the k*-th group based on the ratio of the radio resources allocated to the k-th group to the number of mobile terminals in the k-th group, and the ratio of the radio resources allocated to the k*-th group to the number of mobile terminals in the k*-th group. Accordingly, even though the downlink channel state measured using the pilot signals may be excellent, the mobile terminals of the k-th group do not feed back the measured downlink channel state each time they measure the downlink channel state, but determine whether to feed back the measured downlink channel state based on the access probability assigned to the k-th group each time they measure the downlink channel state. Accordingly, compared to the k*-th group, a comparatively greater transmission latency may occur when the mobile terminals of the k-th group use a desired service.

A computer-readable medium may be encoded with processing instructions for implementing a multi-user diversity communication method according to an aspect of the invention performed by a computer. The computer-readable medium may also be encoded with data files, data structures, and the like in addition to the processing instructions for implementing a multi-user diversity communication method. Examples of suitable computer-readable media include magnetic media such as hard disks, floppy disks, and magnetic tape; optical media such as CD-ROMs and DVDs; magneto-optical media such as magneto-optical disks; and hardware devices that are specially configured to store and perform processing instructions, such as read-only memory (ROM), random access memory (RAM), flash memory, and the like. The processing instructions may also be embodied as a computer data signal in a carrier wave for transmission over a transmission medium such as optical or metallic lines, waveguides, the Internet, air, space, and the like. The computer data signal may also include data files, data structures, and the like in addition to the processing instructions for implementing for implementing a multi-user diversity communication method. Examples of processing instructions include both machine code, such as machine code produced by a compiler, and higher level code that may be executed by the computer using an interpreter. The above-described hardware devices may be configured to act as one or more software modules to perform the operations of the above-described aspects of the invention.

According to aspects of the invention, when a mobile terminal feeds back downlink channel state information to a base station via an uplink, an amount of feedback information can be reduced, and thus radio resources may be effectively used. Also, the base station may readily make determinations based on the feedback information.

According to aspects of the invention, a base station can receive downlink channel state information fed back from each mobile terminal, and transmit downlink data to only mobile terminals having an excellent downlink channel state. Also, the base station may not consider a portion of fed-back downlink channel state information when selecting a mobile terminal to receive data. Accordingly, a mobile terminal to receive data via a downlink may be readily selected and an amount of calculation may be reduced.

Although several embodiments of the invention have been shown and described, it would be appreciated by those skilled in the art that changes may be made in these embodiments without departing from the principles and spirit of the invention, the scope of which is defined by the claims and their equivalents.

What is claimed is:

1. A communication apparatus comprising:
   a mobile terminal to measure a downlink channel state of a downlink between a base station and the mobile terminal, and to determine whether to transmit feedback information about the downlink channel state to the base station based on the measured downlink channel state, wherein:

a predetermined access probability is assigned to the mobile terminal; and the mobile terminal determines whether to transmit the feedback information about the downlink channel state to the base station based on the access probability and the measured downlink channel state.

2. The communication apparatus of claim 1, wherein the downlink channel state of the mobile terminal comprises a downlink signal-plus-interference to noise ratio (SINR).

3. The communication apparatus of claim 2, wherein the mobile terminal determines not to transmit the feedback information to the base station when the downlink SINR is less than a predetermined threshold value.

4. The communication apparatus of claim 1, wherein the access probability is determined based on wireless resources allocated to a group of mobile terminals including the mobile terminal, and a total number of mobile terminals in the group of mobile terminals.

5. The communication apparatus of claim 4, wherein the access probability is calculated using the following equations:

$$k^* = \underset{1 \leq k \leq K}{\mathrm{argmax}} \frac{R_k}{\alpha_k \cdot n}$$

$$p_k = \begin{cases} \frac{\alpha_{k^*} \cdot R_k}{\alpha_k \cdot R_{k^*}}, & \text{for } k \neq k^* \\ 1, & \text{for } k = k^* \end{cases},$$

$$p_k = \begin{cases} \frac{\alpha_{k^*} \cdot R_k}{\alpha_k \cdot R_{k^*}}, & \text{for } k \neq k^* \\ 1, & \text{for } k = k^* \end{cases}$$

where $p_k$ is an access probability assigned to a k-th group of mobile terminals, $\alpha_k$ is a ratio of the total number of mobile terminals in the k-th group to a total number of mobile terminals served by the base station, $R_k$ is a ratio of a total amount of wireless resources allocated to the k-th group to a total amount of wireless resources allocated to the base station, and n is the total number of mobile terminals served by the base station.

6. A communication apparatus comprising:
a base station to determine whether to transmit data to a mobile terminal based on feedback information received from the mobile terminal about a downlink channel state of a downlink between the base station and the mobile terminal;
wherein the base station measures an uplink channel state of an uplink between the mobile terminal and the base station over which the feedback information is received from the mobile terminal, and determines whether to use the feedback information, received from the mobile terminal based on the measured uplink channel state.

7. The communication apparatus of claim 6, wherein the uplink channel state comprises an uplink signal-plus-interference to noise ratio (SINR).

8. The communication apparatus of claim 7, wherein the base station determines to use the feedback information received from the mobile terminal when the uplink SINR is greater than a predetermined threshold value.

9. The communication apparatus of claim 6, wherein:
the mobile terminal is one of a plurality of mobile terminals served by the base station;
the plurality of mobile terminals are grouped into at least one group of mobile terminals;
an access probability is assigned to each group of the at least one group of mobile terminals so that a same access probability is assigned to each of the mobile terminals that belong to a same group; and each mobile terminal of the plurality of mobile terminals determines whether to transmit feedback information to the base station about a downlink channel state of a downlink between the base station and that mobile terminal based on the access probability assigned to that mobile terminal.

10. The communication apparatus of claim 9, wherein the plurality of mobile terminals are grouped into the at least one group of mobile terminals based on a data transmission rate between each of the plurality of mobile terminals and the base station.

11. A method of communicating between a mobile terminal and a base station, the method comprising:
measuring, in the mobile terminal, a downlink channel state of a downlink between the base station and the mobile terminal; and
determining, in the mobile terminal, whether to transmit feedback information about the downlink channel state to the base station based on the measured downlink channel state, wherein:
a predetermined access probability is assigned to the mobile terminal; and
the determining of whether to transmit feedback information comprises determining whether to transmit the feedback information about the downlink channel state to the base station based on the access probability and the measured downlink channel state.

12. The method of claim 11, wherein the downlink channel state of the mobile terminal comprises a downlink signal-plus-interference to noise ratio (SINR).

13. The method of claim 12, wherein the determining of whether to transmit feedback information comprises determining not to transmit the feedback information when the downlink SINR is less than a predetermined threshold value.

14. The method of claim 11, wherein:
the mobile terminal is one of a plurality of mobile terminals served by the base station;
the plurality of mobile terminals are grouped into at least one group of mobile terminals; and
an access probability is assigned to each group of the at least one group of mobile terminals so that a same access probability is assigned to each of the mobile terminals that belong to a same group.

15. The method of claim 14, wherein the plurality of mobile terminals are grouped into the at least one group of mobile terminals based on a data transmission rate between each of the plurality of mobile terminals and the base station.

16. The method of claim 14, wherein the access probability assigned to each group of the at least one group of mobile terminals is determined based on wireless resources allocated to that group of mobile terminals, and a total number of mobile terminals in that group of mobile terminals.

17. The method of claim 16, wherein the access probability assigned to each group of the at least one group of mobile terminals is calculated using the following equations:

$$k^* = \underset{1 \leq k \leq K}{\mathrm{argmax}} \frac{R_k}{\alpha_k \cdot n}$$

$$p_k = \begin{cases} \frac{\alpha_{k^*} \cdot R_k}{\alpha_k \cdot R_{k^*}}, & \text{for } k \neq k^* \\ 1, & \text{for } k = k^* \end{cases}$$

where $p_k$ is an access probability assigned to a k-th group of mobile terminals, $\alpha_k$ is a ratio of a total number of mobile terminals in the k-th group to a total number of mobile terminals served by the base station, $R_k$ is a ratio of a total amount of wireless resources allocated to the k-th group to a total amount of wireless resources allocated to the base station, and n is the total number of mobile terminals served by the base station.

18. A method of determining whether to transmit data from a base station to a mobile terminal based on feedback information received by the base station from the mobile terminal about a downlink channel state of a downlink between the base station and the mobile terminal, the method comprising:
    measuring an uplink channel state of an uplink between the mobile terminal and the base station over which the feedback information is received by the base station from the mobile terminal; and
    determining whether to use the feedback information received by the base station from the mobile terminal based on the measured uplink channel state.

19. The method of claim 18, wherein the uplink channel state comprises an uplink signal-plus-interference to noise ratio (SINR).

20. The method of claim 19, wherein the determining of whether to use the feedback information received by the base station from the mobile terminal comprises determining to use the feedback information when the uplink SINR is greater than a predetermined threshold value.

21. A computer-readable medium encoded with processing instructions for implementing a method of communicating between a mobile terminal and a base station performed by a computer, the method comprising:
    measuring, in the mobile terminal, a downlink channel state of a downlink between the base station and the mobile terminal; and
    determining, in the mobile terminal, whether to transmit feedback information about the downlink channel state to the base station based on the measured downlink channel state wherein:
    a predetermined access probability is assigned to the mobile terminal; and
    the determining of whether to transmit feedback information comprises determining whether to transmit the feedback information about the downlink channel state to the base station based on the access probability and the measured downlink channel state.

* * * * *